Jan. 15, 1952     R. S. CESARO ET AL     2,582,232
TEMPERATURE-SENSING AND/OR SOUND VELOCITY-MEASURING DEVICE
Filed Sept. 2, 1949
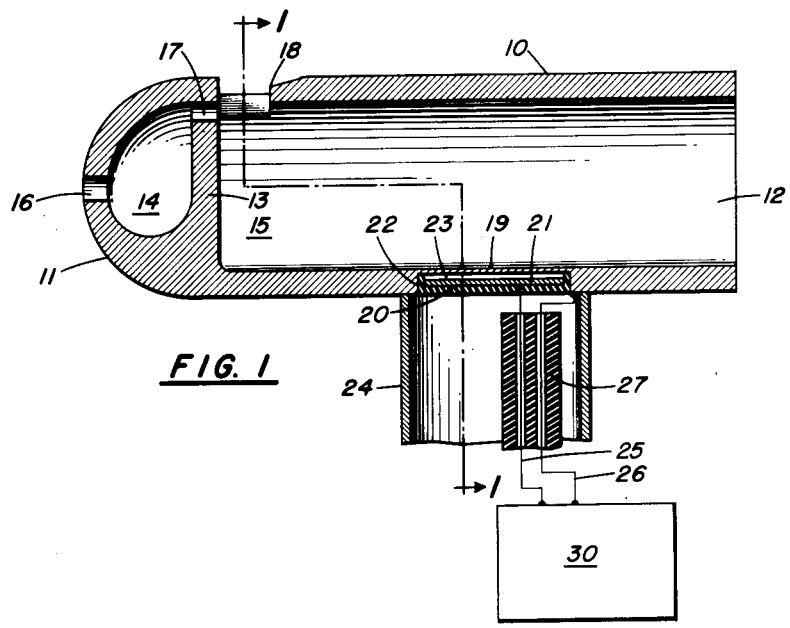
FIG. 1
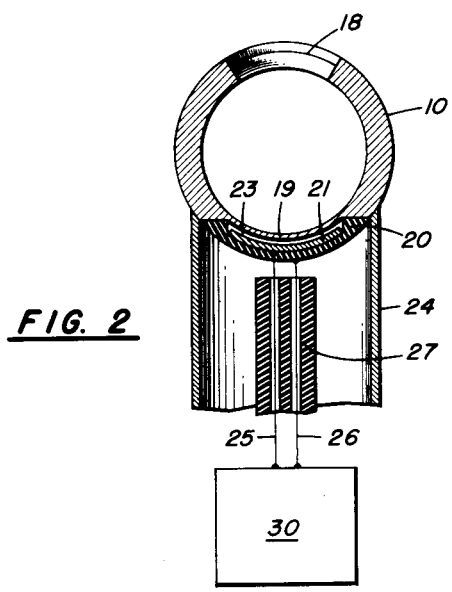
FIG. 2
Inventors
RICHARD S. CESARO
HERBERT B. HARRIS
Attorney Patented Jan. 15, 1952

2,582,232

UNITED STATES PATENT OFFICE 2,582,232

TEMPERATURE-SENSING AND/OR SOUND VELOCITY-MEASURING DEVICE

Richard S. Cesaro and Herbert B. Harris, Cleveland, Ohio

Application September 2, 1949, Serial No. 113,892

2 Claims. (Cl. 73—339)

(Granted under the act of March 3, 1883, as amended April 30, 1928; 370 O. G. 757)

This invention relates generally to temperature sensing devices and specifically to a device to measure the temperature of a fast flowing gas such as intake and exhaust gases of turbines, jet motors, or the like.

Present devices for the measurement of such gases have inherent defects of time lag and errors due to erosion and corrosion by high temperatures of the gases.

An object of the present invention is to provide an instrument which will measure the temperature of a fast flowing stream of gas without any appreciable time lag.

Another object is to provide a temperature sensing device which will be virtually free of any deleterious effect of erosion or burning by hot gases.

Another object is to provide a temperature sensing device which is also useful in measuring the velocity of sound travelling in the medium.

Other objects and features of the invention will become apparent to those skilled in the art as the disclosure is made in the following detailed description of a preferred embodiment of the invention as illustrated in the accompanying sheet of drawing in which:

Fig. 1 is a side view in section, and Fig. 2 is a view in section taken on line 1—1 of Fig. 1.

Referring to the drawing, in Figs. 1 and 2, the body 10 is of substantially cylindrical shape and has a rounded upstream end 11 and an open downstream end 12. Near the upstream end is a partition 13 separating the body into two chambers 14 and 15. Chamber 14 has an opening 16 and a port 17 in the partition. The chamber 15 has a bevel-edged port 18 adjacent the partition 13 and port 17. Midway of the open ended chamber 15 is the thin walled portion 19 having an insulating material 20 and capacitance plate 21 in the outer recess 22 and separated from the thin walled portion 19 of the body 10 by an air space 23. A support 24 which may be tubular as here shown has electrical conductors 25 and 26 positioned therein and shielded by insulation 27. The electrical conductors 25 and 26 are connected to the body 10 and to the capacitance plate 21 respectively and are connected to an electronic means 30 for detecting the change in capacity of the plate 21 with respect to the thin walled portion 19. The frequency of this capacity change may be indicated on a frequency meter included in the electronic means 30, and the frequency scale may be calibrated in terms of absolute temperature and velocity of sound.

In operation the body 10 is supported in a stream of gases with the opening 16 in chamber 14 admitting a portion of the gases. The port 17 in partition 13 directs the flow of gas over the beveled edge of port 18 which causes a disturbance in the gases in chamber 15 and the frequency of such disturbance is detected by the change in capacitance between the plate 21 and the adjacent portion of the body 10.

The frequency of vibration of the gaseous column in the open ended chamber 15 is the function of the number of loops formed by the vibration, the effective tube length, and the velocity of sound in the chamber. Equation 1 represents the relationship:

$$f = \frac{nV}{2l} \qquad (1)$$

where
$f$=frequency of vibration of the gaseous column in the chamber
$n$=number of loops formed by the vibrations
$V$=velocity of sound in the gaseous column in the chamber
$l$=effective chamber length The velocity of sound in a gaseous medium may be expressed as a function of the specific heat ratio, acceleration of gravity, the gas constant, and the absolute gas temperature. This relationship is expressed as Equation 2.

$$V = \sqrt{\gamma g R T} \qquad (2)$$

where
$V$=velocity of sound in a gaseous medium
$\gamma$=ratio of the specific heats of the gaseous medium $$\frac{C_p}{C_v}$$

$g$=acceleration of gravity
$R$=gas constant
$T$=absolute temperature

The terms of Equation 2 may be grouped as below $$V = \sqrt{\gamma g R} \times \sqrt{T} \qquad (3)$$

Combining Equations 1 and 3 and solving for the temperature $$T = \frac{4l^2}{g n^2 \gamma R} f^2 \qquad (4)$$

For a practical application of the temperature-sensing device, all of the factors in Equation 4 except the frequency $f$ are substantially constant. The acceleration of gravity $g$ is, of course, constant. For fixed-chamber dimensions, the effective chamber length $l$ is a constant. Any fixed mode of vibration of the gaseous column in the chamber in a fundamental manner will determine the constant number of loops $n$ formed by the vibrations. The gas constant R is a constant for a gas of any fixed composition. The value of the specific heat ratio $\gamma$ is constant for a gas of any fixed composition in a limited-temperature range. Therefore, for a practical application of the subject temperature-sensing device in a limited-temperature range, the temperature may be determined from the following equation:

$$T = (\text{constant}) l \times f^2 \quad (5)$$

where $$\text{Constant } l = \frac{4l^2}{gn^2\gamma R}$$

For a practical application of the subject temperature-sensing device over an unlimited-temperature range, a correction factor $F_c$ to account for the variation of the specific heat ratio $\gamma$ and the change in effective chamber length with temperature may be included if the degree of accuracy desired requires it. The correction factor may be expressed as a function of the temperature $T$. The temperature may be expressed as a function of the frequency $f$, Equation 4. Therefore, the correction factor may be expressed as a function of the frequency, $f$, of the vibrating gaseous column in the chamber and the value of the correction factor for different values of $f$ may be determined. The equation for a practical application of the subject temperature-sensing device over an unlimited-temperature range is $$T = F_c \times (\text{constant}) l \times f \quad (6)$$

where $F_c$ = correction factor for the variation of temperature (constant)

$$l = \frac{4l^2}{gn^2\gamma R}$$

For use of the subject device to determine the velocity of sound, the terms of Equation 1 may be rewritten as below.

$$V = \frac{2l}{n} f \quad (7)$$

where $f$ = frequency of vibration of the gaseous column in the chamber
$n$ = number of loops formed by the vibrations
$l$ = effective chamber length For a practical application of the subject velocity-of-sound-sensing device, all of the factors in Equation 7 are constant except the frequency $f$. For fixed-chamber dimensions, the effective chamber length $l$ is a constant. Any fixed mode of vibration of the gaseous column in the chamber in a fundamental manner will determine the constant number of loops $n$ formed by the vibrations. Equation 7 may therefore be rewritten thus:

$$V = (\text{constant}) 2f$$

where $$(\text{constant}) 2 = \frac{2l}{n}$$

This device for use as a means of sensing the absolute gas temperature and/or the velocity of sound presents many inherent advantages. The self-excitation action of the device on the gaseous column is one of the major inherent advantages. As a result, the gaseous colmun is set into free vibrations, requiring no external forcing such as periodic impulses imparted by outside agents. The ability of the device to retain inherently a continual self-flushing or sampling action resulting in a rapid rate of response in detecting any changes in the gas temperature and/or the velocity of sound in the gaseous column being evaluated is another important advantage. Stratification of the gaseous column is not inherent as a result of the self-flushing action of this device. Evaluation of the gaseous column within the device in terms of its absolute temperature and/or the velocity of sound is accomplished by sensing the vibration frequency of the gaseous column as indicated by the frequency meter in the electronic means 30 on the temperature and velocity of sound scales above referred to.

It should be understood, of course, that the foregoing disclosure relates to only a preferred embodiment (or embodiments) of the invention and that numerous modifications or alterations, such as partially or completely closing the end 12 of the body 10, may be made therein without departing from the spirit and the scope of the invention as set forth in the appended claims.

The invention described herein may be manufactured and used by or for the Government of the United States of America for governmental purposes without the payment of any royalties thereon or therefor.

What is claimed is:

1. A device for sensing the temperature of a flow of gas comprising a body, a pair of chambers in said body, the first of said chambers adapted to limit the velocity of a flow of gas therethrough, the second of said chambers adapted to confine a vibrating column of the gas to be sensed, an opening between said chambers and a port in said second chamber combining to form a whistle, and electronic means for detecting the frequency of vibration of the column of gas in said second chamber set into vibration by said whistle, said electronic means including a variable capacitor formed between a stationary plate and one wall of the body.

2. A device for sensing the temperature of a flow of gas comprising a body, a pair of chambers in said body, the first of said chambers adapted to limit the velocity of a flow of gas therethrough, the second of said chambers adapted to confine a vibrating column of the gas to be sensed, an opening between said chambers and a port in said second chamber combining to form a whistle, and electronic means for detecting the frequency of vibration of the column of gas in said second chamber set into vibration by said whistle, said electronic means including a variable capacitor one plate of which is responsive to the vibration of the column of gas in said second chamber.

RICHARD S. CESARO.
HERBERT B. HARRIS.

REFERENCES CITED

The following references are of record in the file of this patent:

UNITED STATES PATENTS

| Number | Name | Date |
|---|---|---|
| 2,283,750 | Mikelson | May 19, 1942 |
| 2,458,164 | Hill | Jan. 4, 1949 |